United States Patent
Kim et al.

(10) Patent No.: US 9,329,710 B2
(45) Date of Patent: May 3, 2016

(54) TOUCHSCREEN PANEL AND TOUCHSCREEN DEVICE (71) Applicant: SAMSUNG ELECTRO-MECHANICS CO., LTD., Suwon (KR)

(72) Inventors: Hyun Jun Kim, Suwon (KR); Woo Jin Lee, Suwon (KR); Tah Joon Park, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 42 days.

(21) Appl. No.: 13/848,801

(22) Filed: Mar. 22, 2013

(65) Prior Publication Data

US 2014/0078080 A1  Mar. 20, 2014

(30) Foreign Application Priority Data

Sep. 14, 2012  (KR) .................. 10-2012-0102286

(51) Int. Cl.
*G06F 3/044* (2006.01)
*G06F 3/041* (2006.01)

(52) U.S. Cl.
CPC ............... *G06F 3/041* (2013.01); *G06F 3/044* (2013.01); *G06F 2203/04107* (2013.01)

(58) Field of Classification Search
CPC ... G06F 3/044; G06F 3/04883; G06F 3/0488; G06F 2203/04101; G06F 2203/04107; G06F 3/041
USPC ................................ 345/156–157, 173–179; 178/18.01–18.09; 463/37–38

See application file for complete search history.

(56) References Cited

U.S. PATENT DOCUMENTS

| | | | |
|---|---|---|---|
| 2006/0284639 A1 | 12/2006 | Reynolds | |
| 2007/0062739 A1* | 3/2007 | Philipp et al. | 178/18.06 |
| 2009/0194344 A1* | 8/2009 | Harley et al. | 178/18.06 |
| 2010/0149108 A1* | 6/2010 | Hotelling et al. | 345/173 |
| 2010/0289770 A1* | 11/2010 | Lee et al. | 345/174 |
| 2011/0018838 A1* | 1/2011 | Lee | 345/174 |
| 2011/0050605 A1* | 3/2011 | Pan et al. | 345/173 |
| 2011/0050624 A1* | 3/2011 | Lee et al. | 345/174 |
| 2011/0069022 A1* | 3/2011 | Yokota et al. | 345/173 |
| 2011/0080373 A1* | 4/2011 | Wang et al. | 345/174 |
| 2011/0096020 A1* | 4/2011 | Cranfill | 345/174 |
| 2011/0122087 A1* | 5/2011 | Jang et al. | 345/174 |
| 2011/0157079 A1* | 6/2011 | Wu et al. | 345/174 |
| 2012/0044198 A1* | 2/2012 | Chai et al. | 345/174 |
| 2012/0075218 A1* | 3/2012 | Lin et al. | 345/173 |
| 2012/0306565 A1* | 12/2012 | Hsu | 327/517 |

FOREIGN PATENT DOCUMENTS

KR   10-2011-0113035   10/2011

* cited by examiner

Primary Examiner — MD Saiful A Siddiqui
(74) Attorney, Agent, or Firm — NSIP Law (57) ABSTRACT

There are provided a touchscreen panel and a touchscreen device. The touchscreen panel includes: a plurality of first electrodes extended in a first axis direction; a plurality of second electrodes extended in a second axis direction intersecting with the first axis direction; and a third electrode formed between one first electrode and another first electrode adjacent thereto among the plurality of first electrodes, wherein the third electrode may be engaged with the plurality of first electrodes and formed such that one of either side of the respective first electrodes is exposed.

13 Claims, 5 Drawing Sheets

TOUCHSCREEN PANEL AND TOUCHSCREEN DEVICE

CROSS-REFERENCE TO RELATED APPLICATIONS

This application claims the priority of Korean Patent Application No. 10-2012-0102286 filed on Sep. 14, 2012, in the Korean Intellectual Property Office, the disclosure of which is incorporated herein by reference.

BACKGROUND OF THE INVENTION

Field of the Invention

A touch sensing device, such as a touchscreen, a touch pad, or the like, is an input device attached to a display device to provide an intuitive input method to a user. Recently, various electronic apparatuses, such as mobile phones, personal digital assistants (PDAs), navigation systems, and the like, have been widely used. Especially, as demand for smart phones has increased in recent years, the touchscreen has been increasingly adopted as a touch sensing device capable of providing various input methods in a restricted form factor.

Touchscreens applied to mobile apparatuses may be largely classified as resistive-type touchscreens and capacitive-type touchscreens depending on the method of sensing touch input thereof. Capacitive-type touchscreens have been increasingly applied to mobile apparatuses, due to advantages thereof, such as a relatively long lifespan and easy implementation of various input methods and gestures therein. In particular, capacitive-type touchscreens allow for easier implementation of a multi-touch interface as compared with resistive-type touchscreens, and thus are widely applied to apparatuses such as smart phones and the like.

The capacitive-type touchscreens include a plurality of electrodes having a predetermined pattern. In the capacitive-type touchscreens, electrodes need to be formed in a majority of a touchscreen area, which corresponds to an effective display area of the display device. As a representative example of a capacitive-type touchscreen panel, there is provided a bar and stripe two-layer structure. With respect to an upper stripe electrode, the width thereof is reduced by as much as possible based on the resistance limit thereof, in order to secure strong touch strength. With respect to a lower bar electrode, the width thereof may be increased by as much as possible in order to protect the upper stripe electrode from noise generated from an LCD provided in a lower plate.

However, in the case in which the lower bar electrode is relatively wide, noise in the lower bar electrode itself may be increased, and thus an effect thereof on the upper stripe electrode may be increased. Also, as a gap between the upper and lower electrodes becomes closer, capacitance between intersecting electrodes may be increased, resulting in reducing the rate of change in the capacitance, and thus there is a limit in slimming the touchscreen panel.

RELATED ART DOCUMENT (Patent Document 1) Korean Patent Laid-Open Publication No. 2011-0113035
(Patent Document 2) US Patent Laid-Open Publication No. 2006-0284639

SUMMARY OF THE INVENTION

An aspect of the present invention provides a capacitive-type touchscreen panel and touchscreen device, advantageous for implementing slimness thereof by allowing first electrodes provided on a substrate to have a width equal to or smaller than that of second electrodes, and having high space efficiency by forming a single third electrode engaged with the first electrodes and connected to a ground terminal to decrease the number of wirings.

According to an aspect of the present invention, there is provided a touchscreen panel including: a plurality of first electrodes extended in a first axis direction; a plurality of second electrodes extended in a second axis direction intersecting with the first axis direction; and a third electrode formed between one first electrode and another first electrode adjacent thereto among the plurality of first electrodes, wherein the third electrode may be engaged with the plurality of first electrodes and formed such that one of either side of the respective first electrodes is exposed.

A portion of the plurality of first electrodes may be formed such that a first surface of either side thereof is exposed, and the remainder of the plurality of first electrodes may be formed such that a second surface thereof facing the first surface is exposed.

The third electrode may be grounded through a single wiring.

Each of the plurality of first electrodes may include a branch part extended therefrom and formed between one second electrode and another second electrode adjacent thereto among the plurality of second electrodes.

The branch part may be formed in parallel with the first axial direction and the second axial direction.

The branch part may be extended from an intersection point between the first and second electrodes in a diagonal direction.

The plurality of first electrodes may have widths equal to or smaller than those of the plurality of second electrodes, respectively.

The plurality of respective first electrodes may have a width equal to or smaller than that of the plurality of respective second electrodes.

The touchscreen panel may further include an operating unit determining a touch input by sequentially applying predetermined driving signals to the plurality of respective first electrodes and detecting changes in capacitance from the plurality of second electrodes intersecting with the plurality of first electrodes to which the driving signals are applied.

According to another aspect of the present invention, there is provided a touchscreen device including: a panel unit including a plurality of first electrodes extended in a first axis direction; a plurality of second electrodes extended in a second axis direction intersecting with the first axis direction; and a third electrode formed between one first electrode and another first electrode adjacent thereto among the plurality of first electrodes; and an operating unit electrically connected to the plurality of first electrodes and the plurality of second electrodes to determine a touch input, wherein the third electrode may be engaged with the plurality of first electrodes and formed such that one of either side of the respective first electrodes is exposed.

The operating unit may determine a touch input by applying predetermined driving signals to the first electrodes and detecting changes in capacitance from the second electrodes.

The operating unit may determine at least one of coordinates of the touch input, a gesture motion due to the touch input, and the number of touch inputs.

A portion of the plurality of first electrodes may be formed such that a first surface of either side thereof is exposed, and the remainder of the plurality of first electrodes may be formed such that a second surface thereof facing the first surface is exposed.

The third electrode may be grounded through a single wiring.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
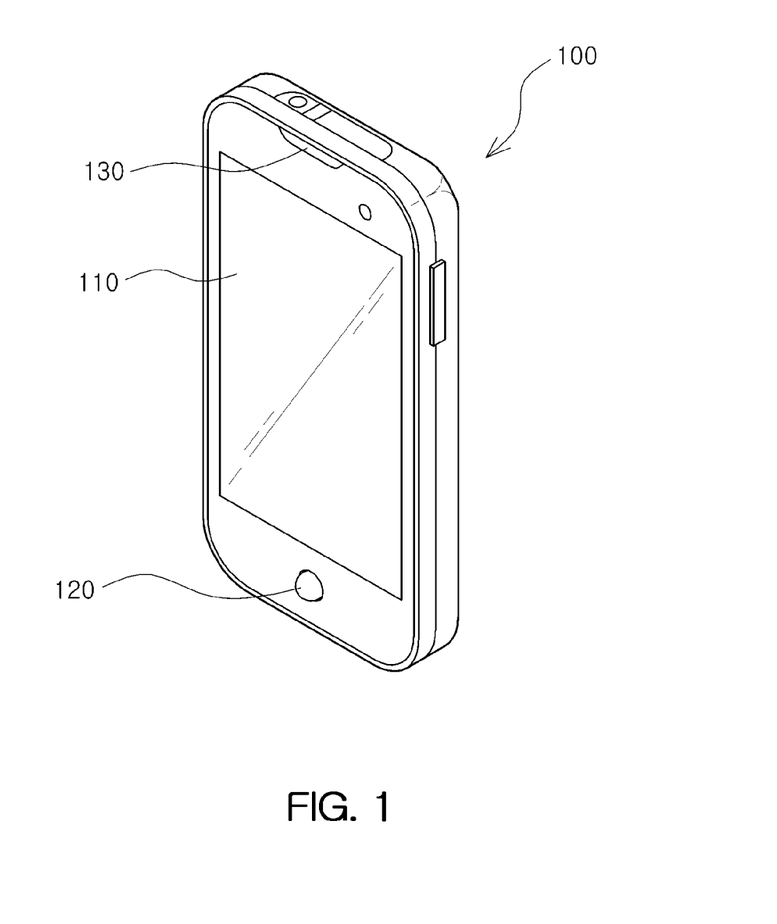
FIG. 1 is a perspective view showing an external appearance of an electronic apparatus including a touchscreen device according to an embodiment of the present invention.
Figure 2:
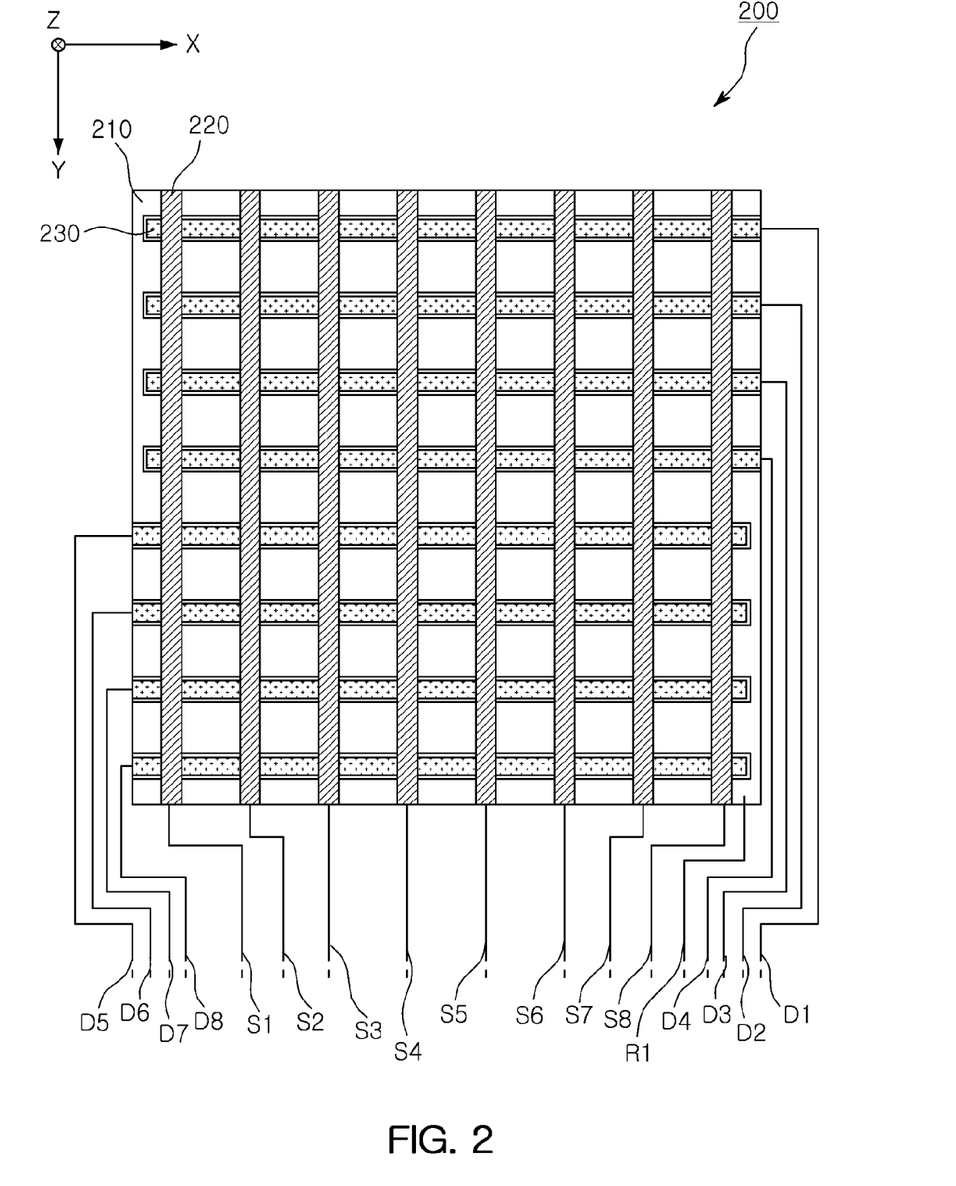
FIG. 2 is a plan view of a touchscreen device according to an embodiment of the present invention.

FIG. 1 is a perspective view showing an external appearance of an electronic apparatus including a touchscreen device according to an embodiment of the present invention. FIG. 2 is a plan view of a touchscreen device according to an embodiment of the present invention.

FIG. 1 is a view showing an electronic apparatus to which a touch sensing device according to an embodiment of the present invention may be applied. Referring to FIG. 1, an electronic apparatus 100 according to the present embodiment may include a display device 110 for outputting a screen therethrough, an input unit 120, an audio unit 130 for outputting a sound and the like, and may be integrated with the display device 110 to provide the touch sensing device.

As shown in FIG. 1, in general, a mobile device may be configured in such a manner that a touch sensing device is integrated with a display device, and the touch sensing device may have a high degree of light transmissivity to which an image passes through a screen displayed on the display device. Thus, the touch sensing device may be manufactured by forming a sensing electrode on a base substrate formed of a transparent film material such as polyethylene terephthalate (PET), polycarbonate (PC), polyethersulfone (PES), polyimide (PI) or the like and the sensing electrode is formed of an electrically conductive material such as indium-tin oxide (ITO), indium zinc oxide (IZO), zinc oxide (ZnO), carbon nanotubes (CNT), a conductive polymer, or graphene. In the present embodiment, the sensing electrode may be formed in a mesh structure in which metals having a very thin line width are densely disposed. A wiring pattern connected to the sensing electrode formed of a transparent conductive material is formed in a bezel region of the display device. Since the wiring pattern is visually shielded by the bezel region, the wiring pattern may also be formed of a metal such as silver (Ag), copper (Cu), or the like.

Certainly, in the case in which the touch sensing device according to the present invention is not provided integrally with a display device, such as a touch pad of a notebook computer, the sensing electrodes may be fabricated by simply patterning metals on a circuit board. However, for convenience of explanation, the touch sensing device and a touch sensing method according to the present invention will be described based on a touchscreen device.

FIG. 2 is a plan view of a touchscreen device according to an embodiment of the present invention.

Referring to FIG. 2, a touchscreen panel 200 according to the present embodiment may include a substrate and a plurality of first electrodes 230, a plurality of second electrodes 220, and a third electrode 210 provided on the substrate. Although not shown in FIG. 2, the plurality of first and second electrodes 230 and 220 may be respectively electrically connected with wiring patterns of a circuit board, which is bonded to one end of the substrate, through wirings and bonding pads. A controller integrated circuit is mounted on the circuit board to detect a sensing signal generated from the plurality of first and second electrodes 230 and 220 and determine a touch input therefrom.

In the case of the touchscreen device, the substrate may be a transparent substrate for forming the plurality of first electrodes 230, the plurality of second electrodes 220, and the third electrode 210 thereon, and may be formed of a plastic material such as polyimide (PI), polymethylmethacrylate (PMMA), polyethyleneterephthalate (PET), or polycarbonate (PC), or tempered glass. Further, with respect to a region in which the wirings connected to the plurality of first electrodes 230, the plurality of second electrodes 220, and the third electrode 210 are formed, except for a region in which the plurality of first electrodes 230, the plurality of second electrodes 220, and the third electrode 210 are formed, a predetermined printing region may be formed on the substrate in order to visually shield the wirings which are generally formed of an opaque metal material.

The plurality of first electrodes 230, the plurality of second electrodes 220, and the third electrode 210 may be provided on one surface or both surfaces of the substrate. In the case of the touchscreen device, the plurality of first electrodes 230, the plurality of second electrodes 220, and the third electrode 210 may be formed of indium tin-oxide (ITO), indium zinc-oxide (IZO), zinc oxide (ZnO), carbon nano tube (CNT), a graphene based material, or the like, having transparency and conductivity.

The plurality of first electrodes 230 may be extended in an X-axis direction, and the plurality of second electrodes 220 may be extended in a Y-axis direction. The first electrodes 230 and the second electrodes 220 may intersect each other on both surfaces of the substrate, or on different substrates. In the case in which the first electrodes 230 and the second electrodes 220 are all provided on one surface of the substrate, predetermined insulating layers may be partially formed in intersections between the first electrodes 230 and the second electrodes 220.

The third electrode 210 may be formed on the same surface as a surface on which the plurality of first electrodes 230 are formed, and be formed between one first electrode and another first electrode adjacent thereto among the plurality of first electrodes 230 so as to have a shape in which the third electrode 210 is engaged with the plurality of first electrodes

230. The third electrode 210 may have a shape in which a side thereof is partially continuous such that only one of either side of respective first electrodes 230 may be exposed. Referring to FIG. 2, when the plurality of first electrodes 230 and the plurality of second electrodes 220 are 8×8, a first side of either side of four first electrodes 230 disposed in an upper portion in the Y-axis direction may be exposed and a second side thereof facing the first side may be enclosed by the third electrode 210. Likewise, a second side of either side of four first electrodes 230 disposed in a lower portion in the Y-axis direction may be exposed and a first side thereof facing the second side may be enclosed by the third electrode 210.

The third electrode 210 may be connected to a channel R1, and the channel R1 may be connected to a ground terminal to allow the third electrode 210 to be grounded. The third electrode 210 is formed as a single electrode, such that the entire third electrode 210 may be ground using a single channel. Therefore, the number of channels is decreased, whereby space efficiency of the touchscreen panel may be increased. The third electrode 210 is formed between the plurality of first electrodes 230 to decrease an exposed area of the plurality of second electrodes 220 exposed to a liquid crystal display (LCD) formed under the plurality of first electrodes 230, whereby a noise shielding effect may be obtained.

The controller integrated circuit, which is electrically connected with the plurality of first and second electrodes 230 and 220 to sense a touch input, may detect changes in capacitance generated from the plurality of first and second electrodes 230 and 220 by the touch input and sense the touch input therefrom. The first electrodes 230 may be connected to channels D1-D8 in the controller integrated circuit, to receive a predetermined driving signal therefrom. The second electrodes 220 may be connected to channels S1~S8 in the controller integrated circuit to thereby allow the touch sensing device to detect a sensing signal. Here, the controller integrated circuit may detect, as a sensing signal, changes in mutual-capacitance generated between the first electrodes 230 and the second electrodes 220, and may be operated in such a manner that driving signals are sequentially applied to the respective first electrodes 230 and the changes in capacitance are simultaneously detected by the second electrodes 220.

When a length of the first electrode 230 extended in the X-axis direction, which is measured in the Y-axis direction, is designated by a width of the first electrode 230, and a length of the second electrode 220 extended in the Y-axis direction, which is measured in the X-axis direction, is designated by a width of the second electrode 220, the width of the first electrode may be equal to or smaller than that of the second electrode. In the case in which the width of the first electrode to which a driving voltage is applied is small, an intersecting area of the first electrode and the second electrode is decreased, and thus, capacitance between the electrodes intersecting each other is reduced, so that a gap between the first electrode and the second electrode may be decreased. Therefore, a two-layer structured touchscreen panel can be advantageously slimmed.

Figure 3:
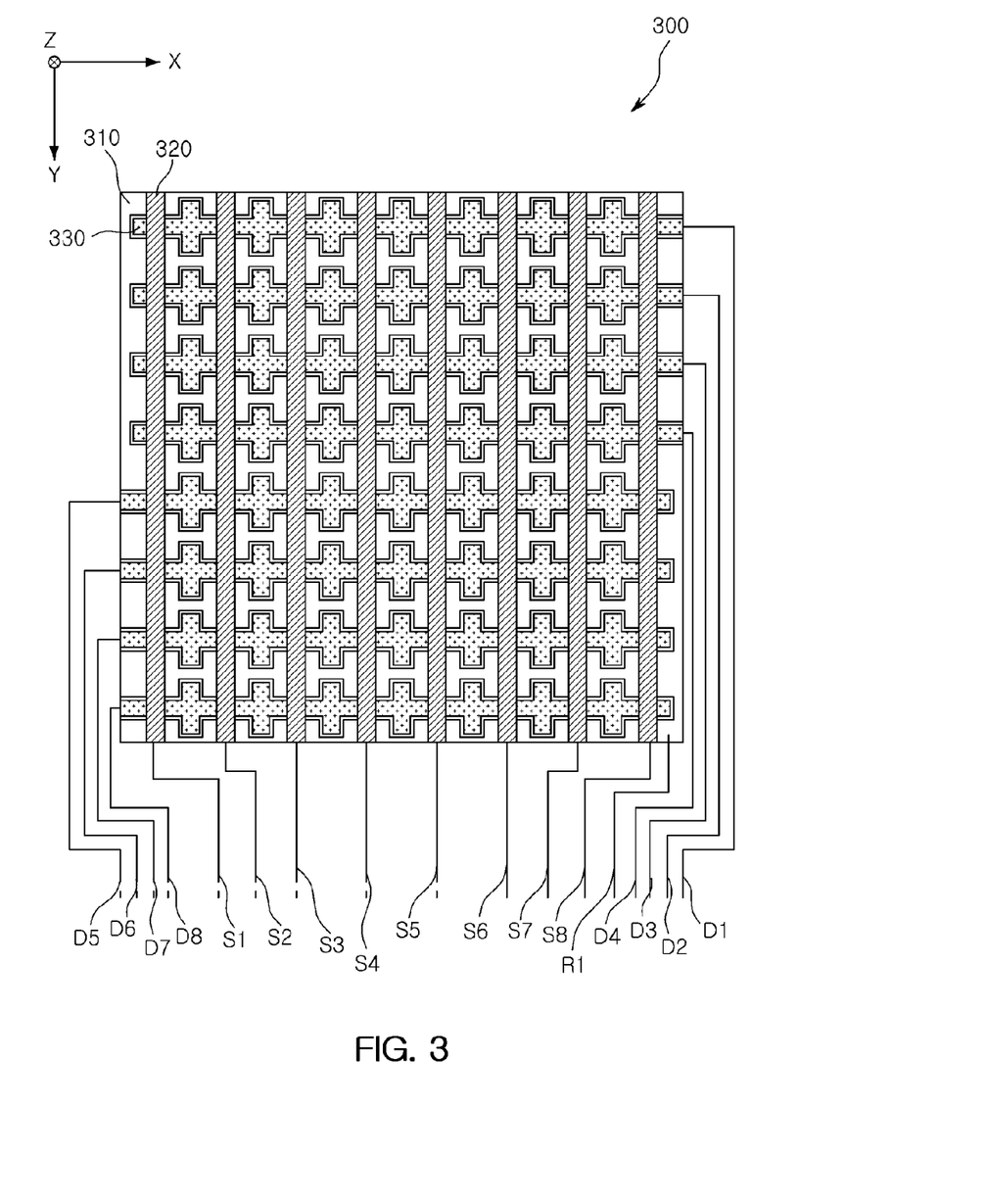
FIG. 3 is a plan view showing a touchscreen device according to another embodiment of the present invention.

FIG. 3 is a plan view showing a touchscreen panel according to another embodiment of the present invention.

Referring to FIG. 3, a touchscreen panel 300 according to the present embodiment may include a substrate and a plurality of first electrodes 330, a plurality of second electrodes 320, and a third electrode 310 provided on the substrate.

The plurality of first electrodes 330 may include branch parts extended therefrom. Each of the branch parts may be formed on at least one of upper and lower portions of the first electrode 330 and be formed between one second electrode and another second electrode adjacent thereto among the plurality of second electrodes 320. The branch parts may be formed in parallel with the X-axis direction and the Y-axis direction. According to the embodiment of the present invention, an electrical field is formed between the branch parts and the second electrodes 320, such that an amount of change in capacitance at the time of the touch input may be increased. Therefore, accuracy in determination of the touch input may be increased.

The third electrode 310 may be formed on the same surface as a surface on which the plurality of first electrodes 330 are formed and be formed between one first electrode and another first electrode adjacent thereto among the plurality of first electrodes 330 so as to have a shape in which the third electrode 310 is engaged with the plurality of first electrodes 330. The third electrode 310 may have a shape in which a side thereof is partially continuous such that only one of either side of respective first electrodes 330 may be exposed. Referring to FIG. 3, when the plurality of first electrodes 330 and the plurality of second electrodes 320 are 8×8, a first side of either side of four first electrodes 330 disposed in an upper portion in the Y-axis direction, that is, first electrodes 330 connected to the channels D1 to D4 may be exposed and a second side thereof facing the first side may be enclosed by the third electrode 310. Likewise, a second side of either side of four first electrodes 330 disposed in a lower portion in the Y-axis direction, that is, first electrodes 330 connected to the channels D5 to D8 may be exposed and a first side thereof facing the second side may be enclosed by the third electrode 310.

Figure 4:
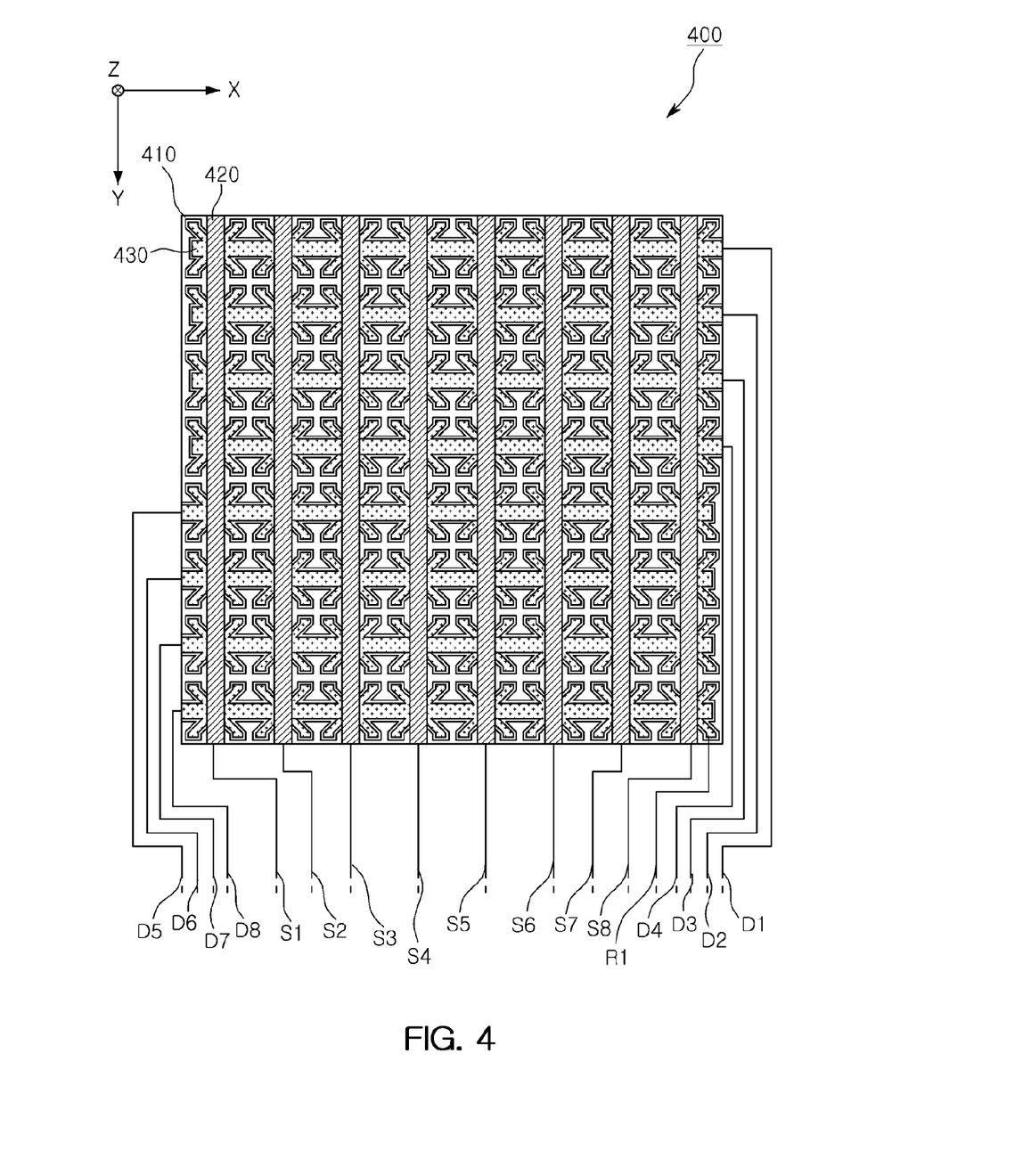
FIG. 4 is a plan view showing a touchscreen device according to another embodiment of the present invention.

FIG. 4 is a plan view showing a touchscreen panel according to another embodiment of the present invention.

Referring to FIG. 4, a touchscreen panel 400 according to the present embodiment may include a substrate and a plurality of first electrodes 430, a plurality of second electrodes 420, and a third electrode 410 provided on the substrate.

The plurality of first electrodes 430 may include branch parts extended therefrom. The branch parts may be extended from intersection points between the first electrodes 430 and the second electrodes 420 in diagonal directions. However, the branch parts formed on adjacent first electrodes among the plurality of first electrodes 430 may be spaced apart from each other so as not to be connected to each other. That is, the branch parts formed on one first electrode and the branch parts formed on another first electrode adjacent thereto among the plurality of first electrodes 430 may be spaced apart from each other so as not to be connected to each other. In the case in which the width of the first electrodes 430 is small, it is advantageous for slimness of the touchscreen panel, but the amount of change in capacitance is decreased, such that accuracy in determination of the touch input may be deteriorated. According to the embodiment of the present invention, the branch parts are formed while the width of the first electrodes 430 is decreased, such that the amount of change in capacitance at the time of the touch input may be increased by an electrical field formed between the second electrodes 420 and the branch parts, whereby accuracy indetermination of the touch input may be increased.

The third electrode 410 may be formed on the same surface as a surface on which the plurality of first electrodes 430 are formed and be formed between one first electrode and another first electrode adjacent thereto among the plurality of first electrodes 430 so as to have a shape in which the third electrode 410 is engaged with the plurality of first electrodes 430. The third electrode 410 may have a shape in which a side thereof is partially continuous such that only one of either side of respective first electrodes 430 may be exposed. Referring to FIG. 3, when the plurality of first electrodes 430 and the plurality of second electrodes 420 are 8×8, a first side of either side of four first electrodes 430 disposed in an upper portion in the Y-axis direction, that is, first electrodes 430 connected to the channels D1 to D4 may be exposed and a second side thereof facing the first side may be enclosed by the third electrode 410. Likewise, a second side of either side of four first electrodes 430 disposed in a lower portion in the Y-axis direction, that is, first electrodes 430 connected to the channels D5 to D8 may be exposed and a first side thereof facing the second side may be enclosed by the third electrode 410.

The third electrode 410 may be connected to the channel R1, and the channel R1 may be connected to a ground terminal to allow the third electrode 410 to be grounded. The third electrode 410 is formed as a single electrode, such that the entire third electrode 410 may be ground using a single channel. Therefore, the number of channels is decreased, whereby space efficiency of the touchscreen panel may be increased. The third electrode 410 is formed between the first electrodes 430 to decrease an exposed area of the second electrodes 420 exposed to a liquid crystal display (LCD) formed under the first electrodes 430 in the touchscreen device, whereby a noise shielding effect may be obtained.

Figure 5:
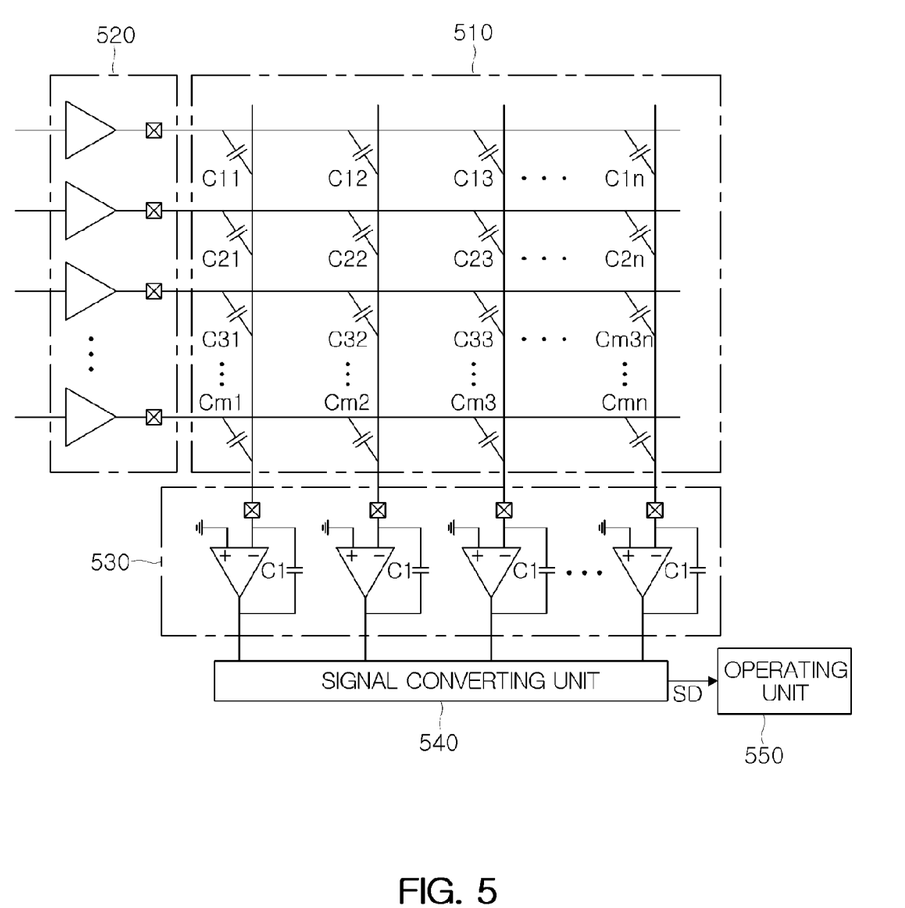
FIG. 5 is a view showing the touchscreen device according to the embodiment of the present invention.

FIG. 5 is a schematic diagram showing the touchscreen device according to the embodiment of the present invention.

Referring to FIG. 5, a touch sensing device, that is, the touchscreen device according to the present embodiment may include a panel unit 510, a driving circuit unit 520, a sensing circuit unit 530, a signal converting unit 540, and an operating unit 550. The panel unit 510 may include a plurality of first electrodes extended in a first axis direction—that is, a horizontal direction in FIG. 5, and a plurality of second electrodes extended in a second axis direction that intersect with the first axis direction, that is, a vertical direction in FIG. 5. The changes in capacitance C11 to Cmn generated in the intersections between the first electrodes and the second electrodes may be changes in mutual-capacitance generated by driving signals that are applied to the first electrodes from the driving circuit unit 520. Meanwhile, the driving circuit unit 520, the sensing circuit unit 530, the signal converting unit 540, and the operating unit 550 may be realized as a single integrated circuit (IC).

The driving circuit unit 520 may apply predetermined driving signals to the first electrodes of the panel unit 510. The driving signals may include a square wave signal, a sine wave signal, a triangle wave signal, and the like, which have a predetermined cycle and amplitude, and may be sequentially applied to the first electrodes. FIG. 5 illustrates that circuits for applying driving signals are individually connected to the plurality of the first electrodes. However, alternatively, a single driving signal generating circuit may be provided and driving signals may be applied to the respective first electrodes by using a switching circuit.

The sensing circuit unit 530 may include an integration circuit for sensing the changes in capacitance C11 to Cmn from the second electrodes. The integration circuit may include at least one operational amplifier and a capacitor C1 having a predetermined capacitance. An inverting input terminal of the at least one operational amplifier is connected to the second electrodes, and thus, the changes in capacitance C11 to Cmn are converted into an analog signal such as a voltage signal or the like to be output. When driving signals are sequentially applied to the first electrodes, since changes in capacitance C11 to Cmn from the second electrodes may be simultaneously detected, the integration circuit may be provided in an amount equal to the number (i.e., m) of second electrodes.

The signal converting unit 540 generates a digital signal $S_D$ from the analog signal generated by the integration circuit. For example, the signal converting unit 540 may include a time-to-digital converter (TDC) circuit for measuring a period of time for which an analog signal output in the form of voltage from the sensing circuit unit 530 reaches a predetermined reference voltage level and converting the period of time into the digital signal $S_D$ or an analog-to-digital converter (ADC) circuit for measuring an amount by which a level of the analog signal output from the sensing circuit unit 530 is changed for a predetermined period of time and converting the amount into the digital signal $S_D$. The operating unit 550 determines a touch input applied to the panel unit 510 by using the digital signal $S_D$. For example, the operating unit 550 may determine the number of touch inputs applied to the panel unit 510, coordinates of the touch input, a gesture based on the touch input, or the like.

As set forth above, according to the embodiments of the present invention, in order to provide the touchscreen panel and the touchscreen device advantageous for device slimness and having high space efficiency, the first electrodes provided on the substrate are formed to have a width equal to or smaller than that of the second electrodes and the third electrode engaged with the first electrodes and connected to the ground terminal is formed as a single electrode, whereby the number of wirings can be decreased and a noise shielding effect can be obtained.

While the present invention has been shown and described in connection with the embodiments, it will be apparent to those skilled in the art that modifications and variations can be made without departing from the spirit and scope of the invention as defined by the appended claims.

What is claimed is:

1. A touchscreen panel comprising:
external channels;
a substrate;
a plurality of first electrodes each including a portion extending along a first axis direction on a surface of the substrate, one of the plurality of first electrodes including an another portion, which is extended from the portion extending along the first axis direction, extending in a different direction than the first axis direction, and first ends of the plurality of first electrodes being connected to the external channels;
a plurality of second electrodes extended in a second axis direction intersecting with the first axis direction; and
a third electrode directly formed on the same surface of the substrate on which the plurality of the first electrodes are formed, such that at least one portion of the third electrode is interposed in an area between the portion of the plurality of first electrodes and the another portion of the one of the plurality of first electrodes, the third electrode being electrically connectable to a ground,
the plurality of respective first electrodes having a width smaller than that of the plurality of respective second electrodes.

2. The touchscreen panel of claim 1, wherein a portion of the plurality of first electrodes is formed such that the first ends of the portion of the plurality of first electrodes are connected to the external channels, and a remainder of the plurality of first electrodes are formed such that second ends of the remainder of the plurality of first electrodes are connected to the external channels.

3. The touchscreen panel of claim 1, wherein each of the plurality of first electrodes further includes a branch part extended therefrom and formed between one second electrode and another second electrode adjacent thereto among the plurality of second electrodes.

4. The touchscreen panel of claim 3, wherein the branch part is formed in parallel with the first axial direction and the second axial direction.

5. The touchscreen panel of claim 3, wherein the branch part is extended from an intersection point between the first and second electrodes in a diagonal direction.

6. The touchscreen panel of claim 1, further comprising an operating unit determining a touch input by sequentially applying predetermined driving signals to the plurality of respective first electrodes and detecting changes in capacitance from the plurality of second electrodes intersecting with the plurality of first electrodes to which the driving signals are applied.

7. The touchscreen panel of claim 1, wherein the third electrode is formed between a first electrode of the plurality of first electrodes and a second electrode of the plurality of first electrodes, wherein the first electrode of the plurality of first electrodes is adjacent to the second electrode of the plurality of first electrodes.

8. The touchscreen panel of claim 1, wherein the third electrode is formed such that at least two portions of the third electrode are interposed between at least three of the plurality of first electrodes.

9. A touchscreen device comprising:
external channels;
a panel unit including a plurality of first electrodes each including a portion extending along a first axis direction on a surface of the panel unit, one of the plurality of first electrodes including an another portion, which is extended from the portion extending along the first axis direction, extending in a different direction than the first axis direction, and having first ends connected to the external channels;
a plurality of second electrodes extended in a second axis direction intersecting with the first axis direction; and
a third electrode directly formed on the same surface of the panel unit on which the plurality of first electrodes are formed, such that at least one portion of the third electrode is interposed in an area between the portion of the plurality of first electrodes and the another portion of the one of the plurality of first electrodes, the third electrode being electrically connectable to a ground; and
an operating unit electrically connected to the plurality of first electrodes and the plurality of second electrodes to determine a touch input,
the plurality of respective first electrodes having a width smaller than that of the plurality of respective second electrodes.

10. The touchscreen device of claim 9, wherein the operating unit determines a touch input by applying predetermined driving signals to the first electrodes and detecting changes in capacitance from the second electrodes.

11. The touchscreen device of claim 10, wherein the operating unit determines at least one of coordinates of the touch input, a gesture motion due to the touch input, and a counted number of touch inputs.

12. The touchscreen device of claim 9, wherein a portion of the plurality of first electrodes is formed such that first ends of the portion of the plurality of first electrodes are connected to the external channels, and a remainder of the plurality of first electrodes are formed such that second ends of the remainder of the plurality of first electrodes are connected to the external channels.

13. A touchscreen panel comprising:
external channels;
a substrate;
a plurality of first electrodes extended in a first axis direction on a surface of the substrate;
a plurality of second electrodes extended in a second axis direction intersecting with the first axis direction; and
a third electrode formed on the surface of the substrate on which the plurality of the first electrodes are formed, such that at least one portion of the third electrode is interposed in the plurality of first electrodes and first ends of the plurality of the first electrodes are connected to the external channels,
the plurality of respective first electrodes having a width smaller than that of the plurality of respective second electrodes,
one of the plurality of first electrodes further including four branch parts, which are electrically connected to the one of the plurality of first electrodes, to form an X-shape, and
two of the four branch parts, which form the X-shape, being on one side of one of the plurality of second electrodes and another two of the four branch parts, which form the X-shape, being on another side of the one of the plurality of second electrodes.

* * * * *